(12) United States Patent
Harada et al.

(10) Patent No.: US 8,234,666 B2
(45) Date of Patent: Jul. 31, 2012

(54) OPTICAL DISC APPARATUS

(75) Inventors: Nozomu Harada, Kawasaki (JP); Seiji Hamaie, Kawasaki (JP); Shinya Asano, Tokyo (JP); Hisahiro Miki, Chigasaki (JP)

(73) Assignee: Hitachi-LG Data Storage, Inc., Tokyo (JP)

( * ) Notice: Subject to any disclaimer, the term of this patent is extended or adjusted under 35 U.S.C. 154(b) by 374 days.

(21) Appl. No.: 12/422,464

(22) Filed: Apr. 13, 2009

(65) Prior Publication Data
US 2009/0265725 A1 Oct. 22, 2009

(30) Foreign Application Priority Data

Apr. 18, 2008 (JP) ................... 2008-108911

(51) Int. Cl.
*G11B 33/12* (2006.01)
(52) U.S. Cl. ........................................ 720/652
(58) Field of Classification Search .................. 720/601, 720/625
See application file for complete search history.

(56) References Cited

U.S. PATENT DOCUMENTS

2005/0198654 A1* 9/2005 Muta et al. ............... 720/601
2006/0080688 A1* 4/2006 Soeda et al. .............. 720/648

FOREIGN PATENT DOCUMENTS

JP 2005-251317 9/2005

* cited by examiner

*Primary Examiner* — Hoai V Ho
*Assistant Examiner* — Pablo Huerta
(74) *Attorney, Agent, or Firm* — McDermott Will & Emery LLP

(57) ABSTRACT

The present application relates to an optical disc apparatus for carrying out at least one of recording and reproduction of signals onto or from a data recording surface of an optical disc loaded in the optical disc apparatus. The optical disc apparatus is capable of being thinned and lightened while ensuring a mechanical strength and a stiffness, and also capable of restraining sticking of a flexible printed circuit (FPC) connected to the optical pickup and reducing the sliding resistance of the FPC during movement of the optical pickup.

7 Claims, 5 Drawing Sheets

OPTICAL DISC APPARATUS

INCORPORATION BY REFERENCE

The present application claims priority from Japanese application JP2008-108911 filed on Apr. 18, 2008, the content of which is hereby incorporated by reference into this application.

BACKGROUND OF THE INVENTION

The present invention relates to an optical disc apparatus for carrying out at least one of recording and reproduction of signals onto and from a data recording surface of an optical disc loaded in the optical disc apparatus.

RELATED ART

Conventionally, an optical disc apparatus includes a housing having a top cover for covering the top surface of the optical disc apparatus, a bottom cover for covering the lower surface, side surfaces and the rear surface thereof, and a front panel for covering the front surface thereof, the housing incorporating therein a unit mechanism on which an optical disc is loaded. The unit mechanism has a frame serving as a framework occupying the peripheral part thereof. The frame is mounted thereon with an optical pickup which is arranged so as to be movable radially of a loaded optical disc, a spindle motor for rotating the optical disc, and the like. Further, a unit cover having an aperture opened in a range corresponding to the movable range of the optical pickup and the rotating part of the spindle motor, is carried by the unit mechanism on the optical disc opposing surface side on which the optical disc is loaded. Further, the above-mentioned frame is carried thereon with a flexible printed circuit (which will be hereinbelow referred to "FPC") for connecting the movable optical pickup to a circuit board.

Further, the optical disc apparatus adapted to be incorporated in an electronic equipment such as a note-sized personal computer which has been desired to be thinner and more lightweight, is desired so as to be further lightened in view of the desire of thinning and lightening of the electronic equipment as stated above. Thus, there have been devised optical disc apparatus composed of components which are made of lightweight materials, or which have thin wall thickness. However, should the wall thickness of the components be merely thinned, the mechanical strength and the stiffness thereof would be decreased. Thus, the unit cover has in part a drawn structure (rib-like concave and convex structure) in order to aim at reducing the weight thereof while ensuring the mechanical strength thereof.

There have been provided optical disc apparatuses wherein, for example, a cover in which a tray is insertably or extractably formed, is formed with concave or convex ribs (drawn structure) so as to ensure a mechanical strength and a stiffness for the cover so as to allow the cover to be made of a lightweight material, or to have a thinned wall thickness (refer to, for example, JP-2005-251317 as Patent Document 1).

It is noted here that the flexion of the FPC is though restrained by allowing the unit cover to abut against the FPC, but the FPC is moved along with the displacement of the optical pickup, and accordingly, slides along the unit cover. Thus, should the above-mentioned drawn structure be present in the range where the FPC makes contact with the unit cover, the sliding resistance of the FPC becomes higher, resulting in the disadvantages that the FPC is readily deteriorated, and unnecessary load is exerted thereto during the displacement of the optical pickup.

In the optical disc apparatus disclosed in Patent Document 1, the cover is formed therein with a concave rib which has a shape similar to that of a part of the FPC and into which the FPC can come, and accordingly, a part of the FPC is received therein so as to obtain a gap between the tray and the FPC, thereby it is possible to prevent the FPC and the tray from rubbing therebetween. However, in this configuration, the concave rib should be formed being deep, more or less, and accordingly, even though the wall thickness of the cover is thinned, the difference in elevation between concavities and convexities of the ribs becomes larger. Thus, the wall thicknesswise height for arranging the cover is required in view of the above-mentioned difference in elevation, resulting in hindrance to the thinning of the wall.

SUMMARY OF THE INVENTION

The present invention is devised in view of the above-mentioned facts inherent to the prior art, and accordingly, an object of the present invention is to provide an optical disc apparatus which can be thinned and be lightweight while ensuring a mechanical strength and a stiffness and which is also capable of restraining sticking of an FPC and reducing the sliding resistance of the FPC.

To the end, according to the present invention, there is provided an optical disc apparatus for carrying out at least one of recording and reproduction of signals onto and from a data recording surface of an optical disc loaded therein, comprising a frame, a motor attached to the frame, for rotating the loaded optical disc, an optical pickup arranged on the frame and adapted to be displaced in a radial direction of the loaded optical disc, for carrying out at least one of recording or reproduction of signals onto and from the data recording surface of the loaded optical disc, a circuit board attached to the frame, a flexible printed circuit attached to the frame, for connecting the optical pickup and the circuit board, and a unit cover for covering the frame on the mounting surface side of the optical disc, the unit cover having a first zone including an area which is made into contact with the flexible printed circuit, and second zones projected toward the mounting surface side of the optical disc by a degree greater than that of the projection of the first zone, and located on opposite sides of the area which is made into contact with the flexible printed circuit and which is therefore interposed in part between the second zones.

The optical disc apparatus according to the present invention can ensure a mechanical strength and a stiffness, and can be made to be thin and lightweight. Further, the optical disc apparatus according to the present invention can restrain sticking of the flexible printed circuit (FPC), and reduce the sliding resistance of the FPC.

Next, explanation will be made of an optical disc apparatus in the form of preferred embodiments of the present invention with reference to the accompanying drawings wherein:

Other objects, features and advantages of the invention will become apparent from the following description of the embodiments of the invention taken in conjunction with the accompanying drawings.

DESCRIPTION OF PREFERRED EMBODIMENTS OF THE PRESENT INVENTION

Embodiments which will be explained hereinbelow, are mere examples for explaining the present invention, and accordingly, the present invention should not be limited to these embodiments. Thus the present invention can be implemented in various forms without departing the technical concept of the present invention.

Figure 1:
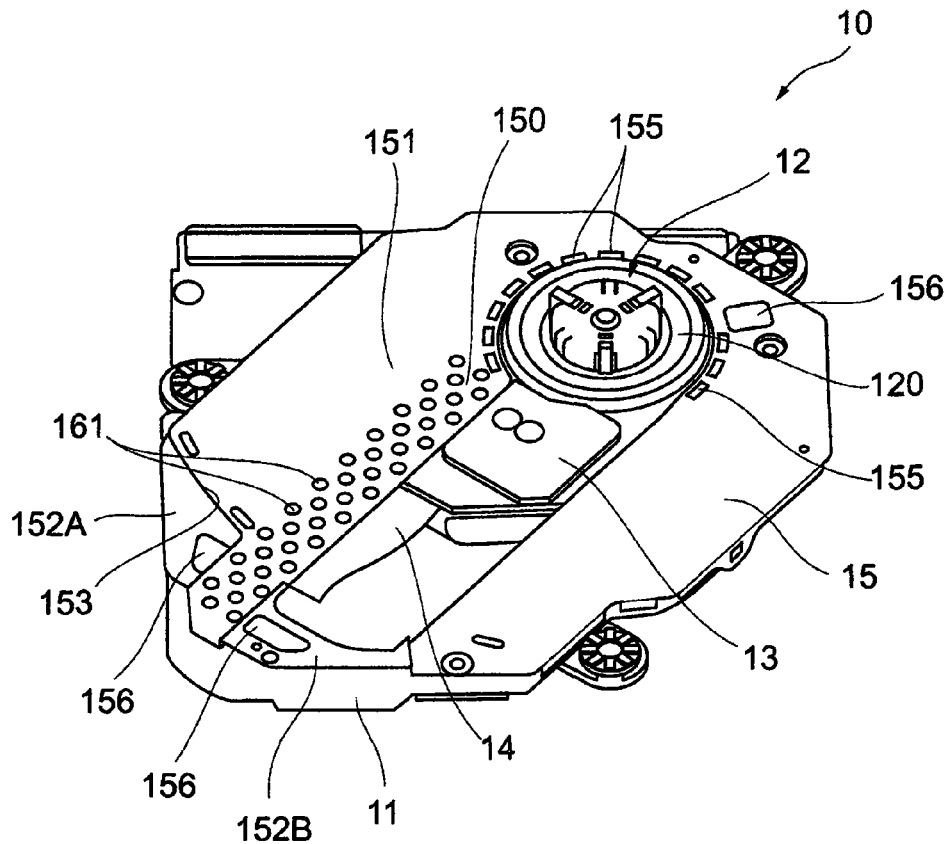
FIG. 1 is a perspective view illustrating an entire configuration of a unit mechanism incorporated in a housing of an optical disc apparatus in an embodiment of the present invention.
Figure 2:
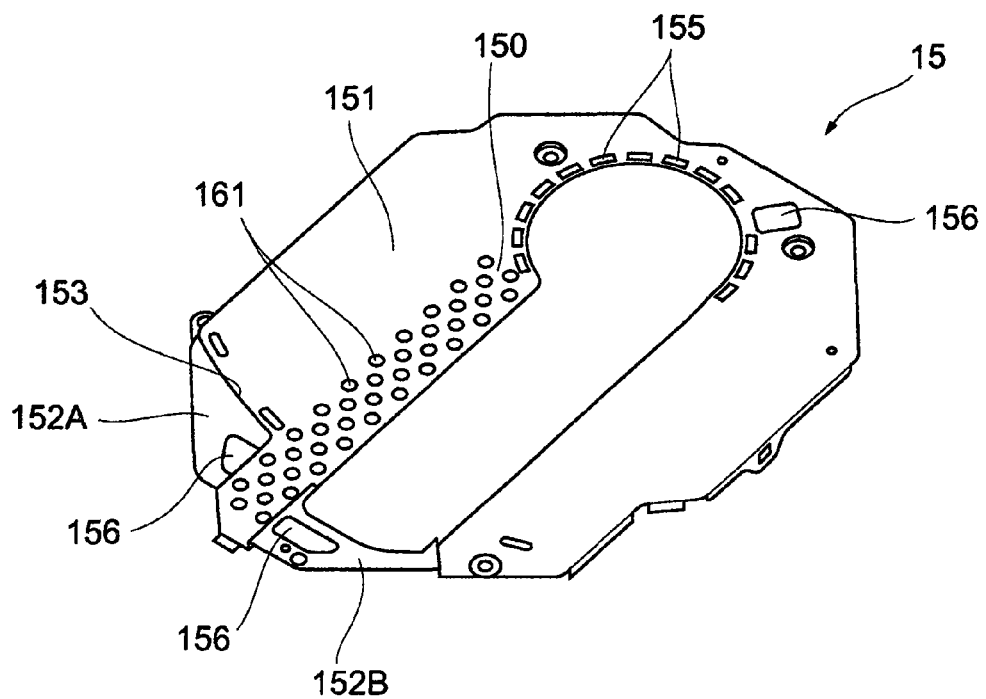
FIG. 2 is a perspective view illustrating a unit cover as a component constituting the unit mechanism shown in FIG. 1.
Figure 3:
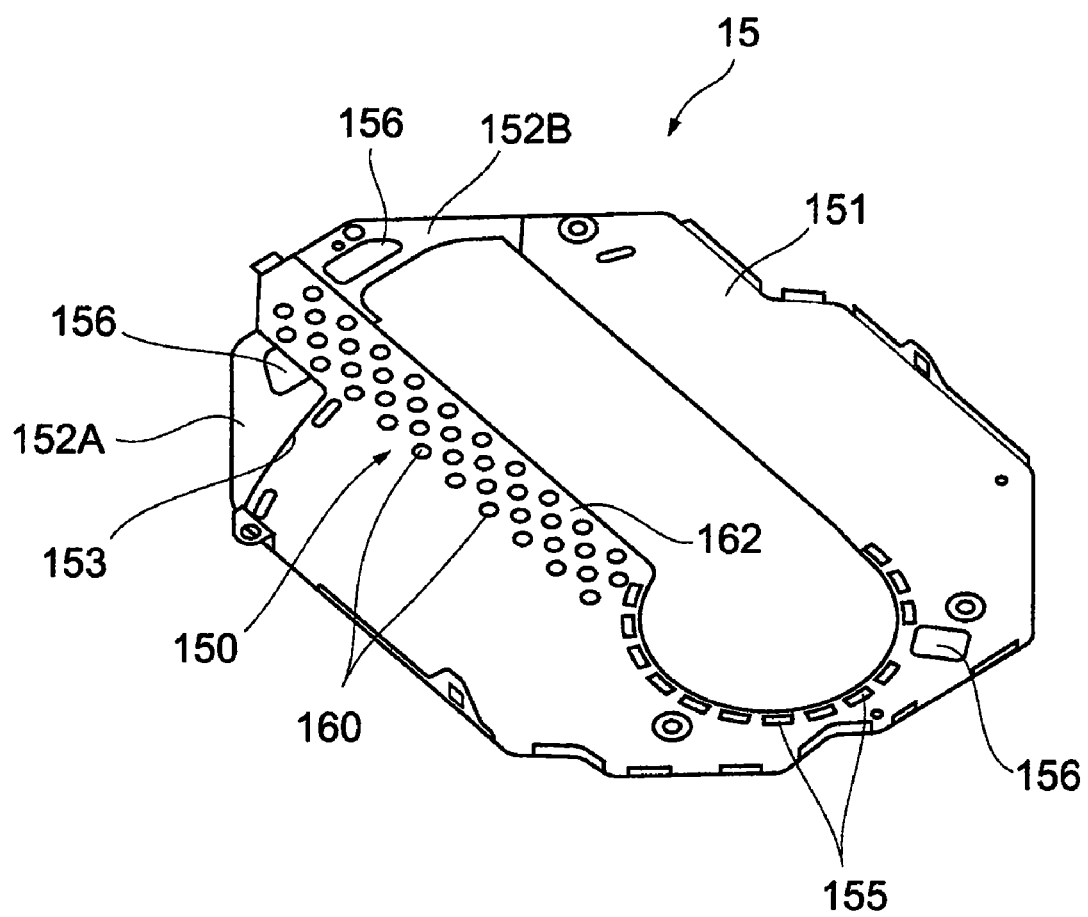
FIG. 3 is a perspective view illustrating the unit cover shown in FIG. 2, as viewed on the opposite side thereof.
Figure 4:
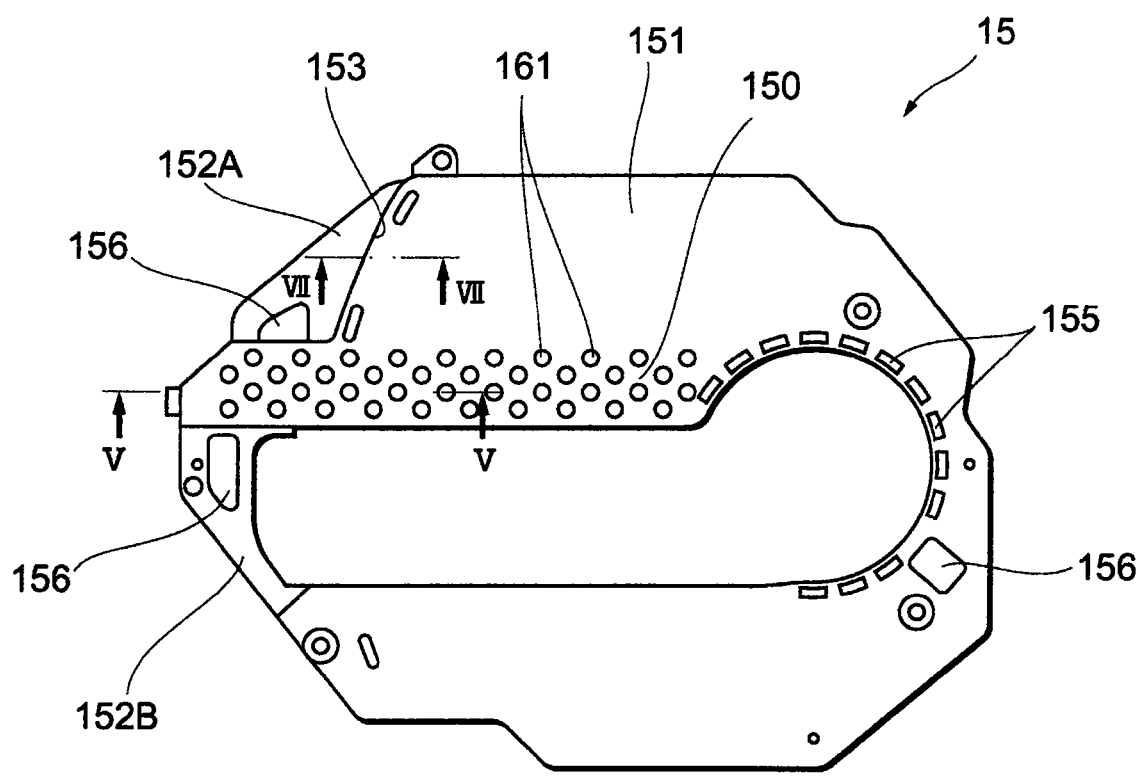
FIG. 4 is a plane view illustrating the unit cover shown in FIG. 2.
Figure 5:
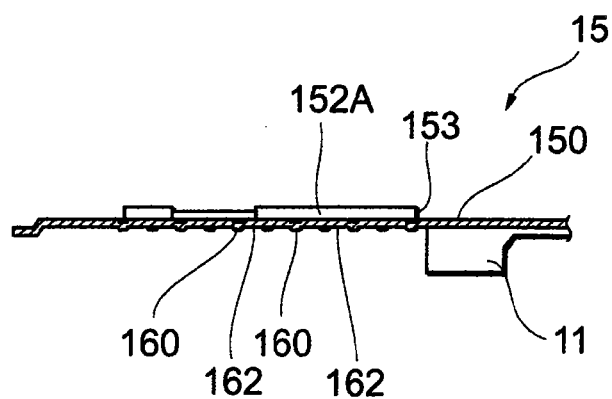
FIG. 5 is a sectional view along line V-V shown in FIG. 4.
Figure 6:
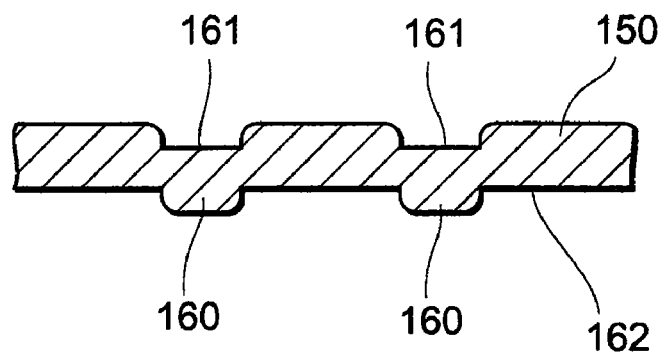
FIG. 6 is an enlarged sectional view illustrating a part of a unit cover shown in FIG. 4.
Figure 7:
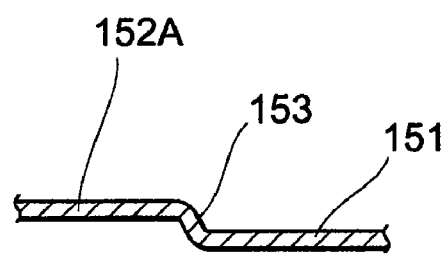
FIG. 7 is an enlarged sectional view along line VII-VII shown in FIG. 4.

FIG. 1 which is a perspective view, shows an entire configuration of a unit mechanism incorporated in a housing of an optical disc apparatus in an embodiment of the present invention; FIG. 2 which is a perspective view, shows a unit cover as a component of the unit mechanism shown in FIG. 1; FIG. 3 which is a perspective view, shows the unit cover shown in FIG. 2, as viewed on the opposite side thereof; FIG. 4 which is a plan view, shows the unit cover shown in FIG. 2, FIG. 5 is a sectional view along line V-V shown in FIG. 4; FIG. 6 which is an enlarged sectional view, shows a part of a unit cover shown in FIG. 4; FIG. 7 is an enlarged sectional view along line VII-VII shown in FIG. 4.

It is noted that the thicknesses and dimensions of components are shown, in these figures, being different from actual sizes of the components, for the sake of brevity in explanation, and further, enlargement ratios and reduction ratios of these figures are not precise. Further, explanation will be made in such a manner that the side where an optical disc is mounted is set to be upward while the side remote from the former side is set to be downward, and the inlet side where the optical disc is loaded is set to be forward while the side remote from the former side is set to be inward.

As shown in FIG. 1, a unit mechanism 10 incorporated in a housing of an optical disc apparatus in this embodiment according to the present invention, incorporates a frame 11 serving as a framework occupying the peripheral portion of the unit mechanism. In the frame 11, there are incorporated a spindle motor 12 for rotating an optical disc loaded in the optical disc apparatus, an optical pickup 12 for carrying out recording and/or reproduction of signals onto and from a data recording surface of the loaded optical disc, an FPC 14 connecting between the optical pickup 13 and a circuit board which is not shown and which is arranged in the housing of the optical disc apparatus, and a unit cover 15 for covering the frame 11 on the mounting surface side of the optical disc.

It is noted, in the optical disc apparatus in this embodiment, that the optical disc is loaded and unloaded at the front surface of the housing, and a slot type system for automatically carrying the optical disc which is therefore discharged by an interior mechanism may be arranged between the front surface and the unit mechanism 10. There may be also used a tray type system in which a tray is projected forward of the housing in the condition that the unit mechanism is fixed therein in the case of unloading the optical disc, and an upper part opening and closing system for loading and unloading the optical disc through the opening and closing of an upper cover of the housing.

A turn table 120 for chucking the outer periphery of the optical disc is arranged in the upper part of the spindle motor 12.

The optical pickup 13 incorporates, for example, a laser diode/laser drive IC for recording and/or reproducing data onto and from an optical disc loaded on the turn table 120, and is supported on guide shafts which are not shown and which are arranged on opposite sides thereof, so as to be movable in a radial direction of the optical disc.

The FPC 14 is extended at its one end from the front side of the optical pickup 13, is turned back in a U-like curved shape, and, accordingly, is connected at the other end to a circuit board (which is not shown) which is arranged in the housing of the optical disc apparatus, inward from the spindle motor 12. This FPC 14 is moved, being accompanied with the displacement of the optical pickup 13, and accordingly, the position of the curved part thereof is changed while making contact with the lower surface of the unit cover 15 which will be explained later.

The unit cover 15 is a plate-like member which is opened in an area corresponding to a part of a movable range of the optical pickup 13, and which is also opened in an area corresponding to the turntable 120. This unit cover 15 has a first zone 151 including a contact area 150 which is made into contact with the FPC 14, and second zones 152A, 152B arranged on opposite side of a part of the contact zone 150 which is therefore interposed in part therebetween.

The contact area 150 is made into contact at its lower surface with the FPC 14 so as to restrain the flexion of the FPC 14. This contact area 150 which is extended in the displacement direction of the pickup 13 (in a radial direction of the optical disc), as shown in FIGS. 1 to 4, is made into contact with the FPC 14 which is moved being accompanied with the displacement of the optical pickup 13 and which is therefore slid on the contact area 150.

It is noted here that no drawn structure (ribs or the like) which has been conventionally formed in order to enhance the mechanical strength, the stiffness and the like of the unit cover 15, is formed in the contact area 150. Accordingly, there is presented no height difference which increases the slide resistance when the FPC is made contact with the contact area 150.

The contact area 150 is formed therein with a plurality of protrusions 160 which are convex as viewed from the lower surface side, as shown, being enlarged, in FIG. 6, and as a result, the lower surface of the contact area 150 is formed therein with concavities and convexities consisting of the plurality of the protrusions 160 and a surface 162 serving as a base from which the protrusions 160 are projected. With this configuration, the FPC 14 is made into contact with the protrusions 160 in the contact area 150 so as to slide thereon. Thus, in comparison with the case that no protrusions 160 are formed, the contact area of the FPC 14 can be decreased, thereby it is possible to reduce the sliding resistance between the FPC 14 and the contact area 150. That is, the slidability of FPC 14 can be enhanced. As a result, there may be restrained occurrence of inconveniences such as, deterioration of the FPC 14 caused by sliding of the FPC 14, and exertion of a load which is unnecessary during the displacement of the latter. It is noted here that the these protrusions 160 are substantially circular, as views in a plan view, and are rounded at their corners so as to further reduce the sliding resistance between the FPC 14 and the contact area 150. Further, due to the provision of the concavities and convexities in the contact area 150, the mechanical strength and the stiffness thereof can be enhanced.

It is noted here that the height of the protrusions 160 (the height in the thicknesswise direction of the unit cover 15) is relatively low, that is, it is, for example about 5 to 15% of the height of the second zones 152A and 152B, and accordingly, the protrusions 160 do not causes any risk of detrimentally affecting upon the thinning of the optical disc apparatus. Incidentally, recesses 161 are formed in the upper surface of the contact area 150 at positions in opposite to the protrusions 160.

The second zone 152A, 152B are formed by drawing a material from which the unit cover 15 is formed, and are projected upward above the first zone 151, as shown in FIG. 7. These second zones 152A, 152B are formed so that a part 153 of each of their boundaries abutting the first zone 151 is located at a position corresponding the outer periphery of the loaded optical disc, and the optical disc is located in the first zone 151 which is formed being recessed from the second zones 152A, 152B as viewed from the upper surface side. Accordingly, if the height of the second zones 152A, 152*b* are set to be substantially equal to, for example, the thickness of the optical disc, there would not be caused any risk of detrimentally affecting upon the thinning of the optical disc apparatus. Thus, by forming the second zones 152A, 152B in the unit cover 15, the mechanical strength and the stiffness of the unit cover 15 can be enhanced.

Further, the unit cover 15 is formed therein with several through-holes 155 along the opening where the turntable 120 is arranged. These through-holes 155 allow occurrence of convection in the unit mechanism 10 when the spindle motor 12 is rotated, so as to have a role of reducing the rotational load of the spindle motor 12 and as well to have a role of restraining the temperature rise. Further, the unit cover 15 is formed also in the front side part and the rear side part thereof with through-holes 156 for restraining the temperature rise.

Figure 8:
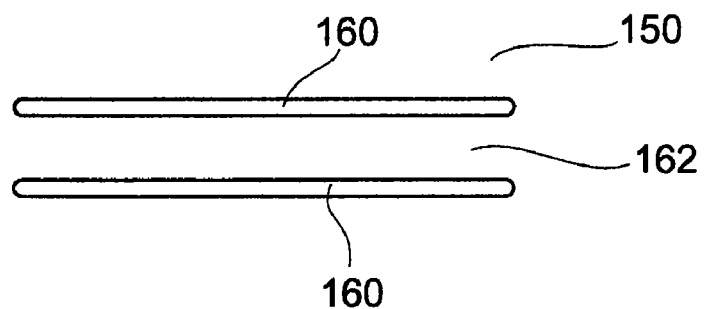
FIG. 8 is a plane view illustrating a pattern of a slide portion in another embodiment of the present invention.
Figure 9:
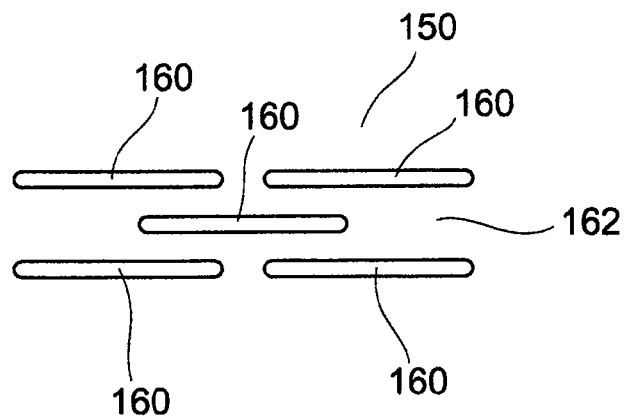
FIG. 9 is a plane view illustrating a pattern of a slide portion in another embodiment of the present invention.

It is noted that explanation has been made, in this embodiment, of the case that the several protrusions 160 having a circular-like shape as viewed in a plan view are formed, as sliding parts which are adapted to make contact with the FPC 14 and which has a slidability, at the lower surface of the contact area 150. However, the present invention should not be limited to this case alone. For example, the sliding parts having a slidability may be rod-like protrusions 160 which are formed at the lower surface of the contact area 150 and which are extended along the direction of displacement of the optical pickup 13, as shown in FIG. 8 which is a schematic view, or may be rod-like protrusions 160 which are formed at the lower surface of the contact area 150 and which are extended along the direction of displacement of the optical pickup 13, being staggered, as shown in FIG. 9. That is, there may be used any other shape if the sliding resistance of the FPC 14 can be reduced. Further, instead of the protrusions 160, there may be used recesses which are formed being recessed upward in the lower surface of the contact area 150.

Figure 10:
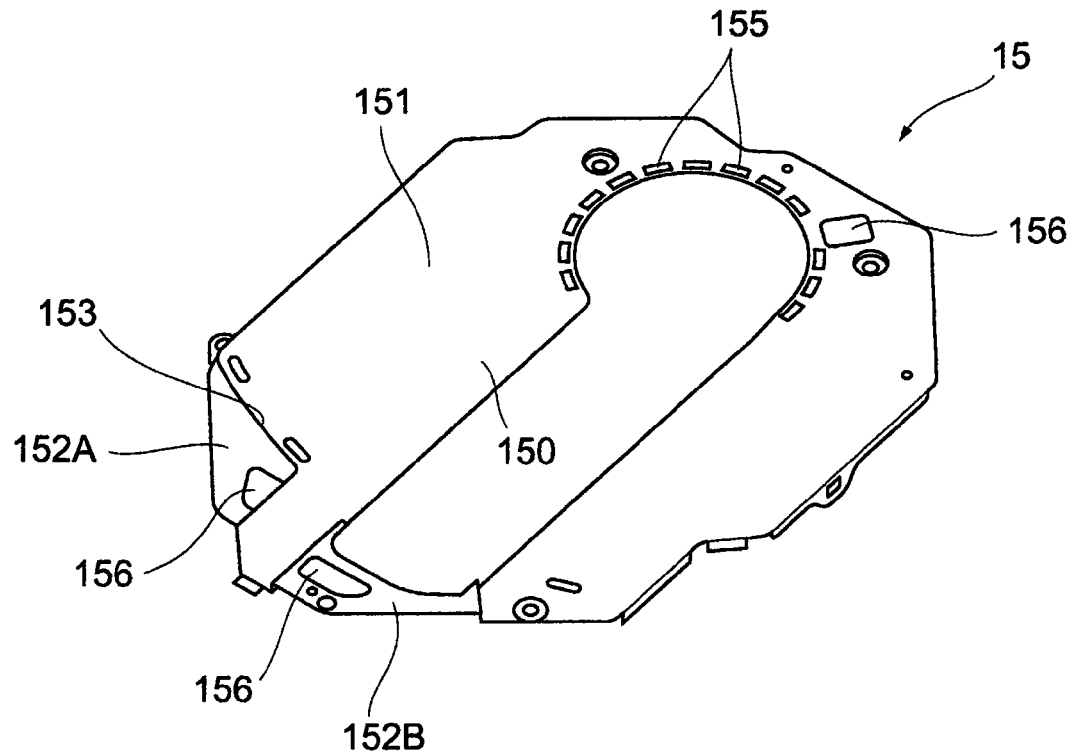
FIG. 10 is a perspective view illustrating a unit cover in another embodiment of the invention.

Further, the unit cover 15 according to the present invention may not be always formed in the contact area with the sliding parts because the sliding resistance of the FPC 14 can be reduced even though no drawn structure is formed in the contact area 150, as shown in FIG. 10. However, in order to further reduce the sliding resistance of the FPC 14, a slide tape or sheet may be applied over the lower surface of the contact area 150.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. An optical disc apparatus for carrying out at least one of recording and reproduction of signals onto and from a data recording surface of an optical disc loaded therein, comprising:
   a frame;
   a motor fixed to the frame, for rotating the loaded optical disc;
   an optical pickup arranged in the frame so as to be movable in a radial direction of the loaded optical disc on the frame, for carrying out at least one of recording and reproduction of signals onto and from the loaded optical disc;
   a flexible printed circuit arranged in the frame, for connecting the optical pickup and the frame; and
   a unit cover fixed to the frame for covering the frame on the optical disc mounting side,
   the unit cover having a zone in contact with the flexible printed circuit when the optical pickup moves on the frame, the zone comprising a plurality of concavities and convexities for reducing the area thereof in contact with said flexible printed circuit when the optical pickup moves on the frame.

2. The optical disc apparatus as set forth in claim 1, wherein the concavities and convexities are concavely formed on the mounting surface side of the optical disc, but are convexly formed on the opposite side to the mounting surface side.

3. An optical disc apparatus for carrying out at least one of recording and reproduction of signals onto and from a data recording surface of an optical disc loaded therein, comprising:
   a frame;
   a motor fixed to the frame, for rotating the loaded optical disc;
   an optical pickup arranged in the frame so as to be movable in a radial direction of the loaded optical disc on the frame, for carrying out at least one of recording and reproduction of signals onto and from the loaded optical disc;
   a flexible printed circuit arranged in the frame, for connecting the optical pickup and the frame; and
   a unit cover fixed to the frame for covering the frame on the optical disc mounting side,
   the unit cover having a first zone including an area made into contact with the flexible printed circuit when the optical pickup moves on the frame to record or reproduce the signals onto or from the data recording surface of the optical disc, and second zones projected toward the mounting surface side of the optical disc from the first zone, which are located on opposite sides of the area made into contact with the flexible printed circuit and interposed in part therebetween.

4. The optical disc apparatus as set forth in claim 3, wherein the first zone comprises a sliding part which has a slidability and which is made into contact with the flexible printed circuit.

5. The optical disc apparatus as set forth in claim 4, wherein the sliding part comprises concavities and convexities for reducing the contact area between the sliding part and the flexible printed circuit.

6. The optical disc apparatus as set forth in claim 5, wherein the concavities and convexities are concavely formed in the first zone on the mounting surface side of the optical disc, but are convexly formed on the side remote from the mounting surface side.

7. The optical disc apparatus as set forth in any one of claims 3 to 6, wherein a part of a boundary between the first zone and each of the second zones is formed at a position corresponding to the outer periphery of the loaded optical disc.

* * * * *